United States Patent
Tajima et al.

(10) Patent No.: US 12,530,432 B2
(45) Date of Patent: Jan. 20, 2026

(54) MODEL OPERATION SUPPORT SYSTEM AND METHOD

(71) Applicant: HITACHI, LTD., Tokyo (JP)

(72) Inventors: Yoshiyuki Tajima, Tokyo (JP); Daisuke Inaba, Tokyo (JP); Yoshinori Mochizuki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 668 days.

(21) Appl. No.: 17/919,757

(22) PCT Filed: May 21, 2021

(86) PCT No.: PCT/JP2021/019404
§ 371 (c)(1),
(2) Date: Oct. 19, 2022

(87) PCT Pub. No.: WO2021/256171
PCT Pub. Date: Dec. 23, 2021

(65) Prior Publication Data
US 2023/0144809 A1    May 11, 2023

(30) Foreign Application Priority Data

Jun. 16, 2020 (JP) .................................. 2020-103530

(51) Int. Cl.
*G06F 18/22* (2023.01)
*G06F 18/21* (2023.01)
*G06N 20/00* (2019.01)

(52) U.S. Cl.
CPC ............ *G06F 18/22* (2023.01); *G06F 18/217* (2023.01); *G06N 20/00* (2019.01)

(58) Field of Classification Search
CPC ........ G06F 18/22; G06F 18/217; G06N 20/00
See application file for complete search history.

(56) References Cited

U.S. PATENT DOCUMENTS

2018/0121815 A1* 5/2018 Lamparter ............. G06N 5/022
2021/0133632 A1* 5/2021 Elprin ................. G06F 11/3409

FOREIGN PATENT DOCUMENTS

| CN | 113033643 B | * 11/2022 | ........... G06F 18/214 |
| JP | 2018-513490 A | 5/2018 | |

OTHER PUBLICATIONS

Indre Zliobaite, Learning under Concept Drift: an Overview (Year: 2010).*

(Continued)

*Primary Examiner* — Justin R. Blaufeld
(74) *Attorney, Agent, or Firm* — MATTINGLY & MALUR, PC (57) ABSTRACT

A system calculates an inter-distribution distance between target data and base data for each of one or more second periods in an entire period between an end time of a first period and a relearning timing of a learning model. For each second period, the target data is data for the second period in the entire data that is data for the entire period. The base data is data for the first period and is data related to creation of the learning model. The system specifies, as a variation point, a time in accordance with the second period during which the calculated inter-distribution distance is greater than or equal to a threshold. The system determines and outputs one or more training data candidates from a part or all of the entire data based on the one or more variation points for relearning of the learning model.

12 Claims, 7 Drawing Sheets

(56) References Cited

OTHER PUBLICATIONS

International Search Report of PCT/JP2021/019404 dated Aug. 10, 2021.

* cited by examiner

| CANDIDATE ID | LABEL | START TIME | END TIME | SWD | ... |
|---|---|---|---|---|---|
| D1 | ALL | t4 | t5 | 171 | ... |
| | Label 1 | t4 | t5 | 123 | ... |
| | Label 2 | t4 | t5 | 143 | ... |
| | Label 3 | t4 | t5 | 156 | ... |
| D2 | ALL | t3 | t5 | 190 | ... |
| ... | ... | ... | ... | ... | ... |

MODEL OPERATION SUPPORT SYSTEM AND METHOD

TECHNICAL FIELD

The present invention generally relates to a computer technology for supporting an operation of a learning model.

BACKGROUND ART

In recent years, systems and services using machine learning are being introduced. Such systems and services typically use a learning model in which input is collected data of a predetermined object and output is data indicating estimation based on the data. The learning model is typically created under the assumption that the predetermined object depends on a time, but input and output of the model are independently and identically distributed, or the predetermined object depends on a short period. However, in practice, concept drift occurs (that is, the tendency of the predetermined object changes with time), and thus the above assumption does not hold. Therefore, the learning model deteriorates (for example, the accuracy of the learning model or the rate of correctness in the learning model greatly decreases). Maintenance such as relearning of the learning model needs to be performed before deterioration of the learning model.

PTL 1 discloses a method for detecting concept drift and causing a learning model to relearn using post-drift process data.

CITATION LIST

Patent Literature

PTL 1: JP 2018-513490 A

SUMMARY OF INVENTION

Technical Problem

PTL 1 discloses that training data to be used for relearning is post-drift process data.

However, in systems and services using machine learning, data of an object for a learning model is frequently collected, resulting in accumulation of a large amount of data. Therefore, a large amount of post-drift process data may be present. When all of the large amount of post-drift process data is used as training data, it takes a long time to perform relearning. Further, not all the post-drift process data is appropriate as training data.

Solution to Problem

The system calculates an inter-distribution distance between target data and base data for each of one or more second periods in an entire period between an end time of a first period and a relearning timing of the learning model of machine learning. The target data is data for each of the second periods in the entire data. The entire data is data for the entire period and is data related to the learning model. The base data is data for the first period and is data related to creation of the learning model. The system determines, for each of the second periods, whether the calculated inter-distribution distance is greater than or equal to a first threshold, and when a result of the determination is true, specifies a time in accordance with the second period as a variation point. The system determines one or more training data candidates from a part or all of the entire data based on the one or more variation points, and outputs the one or more training data candidates or meta-information about the one or more training data candidates for relearning of the learning model.

Advantageous Effects of Invention

According to the present invention, one or more training data candidates appropriate for relearning of a learning model can be determined, and the one or more training data candidates or meta-information about them can be output.

DESCRIPTION OF EMBODIMENTS

In the following description, an "interface device" may be one or more interface devices. The one or more interface devices may be at least one of the following devices.

One or more input/output (I/O) interface devices. The I/O interface device is an interface device for at least one of an I/O device and a remote display computer. The I/O interface device for the display computer may be a communication interface device. The at least one I/O device may be any of a user interface device, for example, an input device such as a keyboard and a pointing device, and an output device such as a display device.

One or more communication interface devices. The one or more communication interface devices may be one or more communication interface devices of an identical type (for example, one or more network interface cards (NIC)) or two or more communication interface devices of different types (for example, an NIC and a host bus adapter (HBA)).

In the following description, a "memory" is one or more memory devices that are an example of one or more storage devices, and may typically be a main storage device. The at least one memory device in the memory may be a volatile memory device or a nonvolatile memory device.

In addition, in the following description, a "permanent storage device" may be one or more permanent storage devices that are an example of one or more storage devices. Typically, the permanent storage device may be a nonvolatile storage device (for example, an auxiliary storage device), and specifically, for example, may be a hard disk drive (HDD), a solid state drive (SSD), a non-volatile memory express (NVME) drive, or a storage class memory (SCM).

Further, in the following description, a "storage device" may be at least a memory among a memory and a permanent storage device.

In the following description, a "processor" may be one or more processor devices. The at least one processor device may typically be a microprocessor device such as a central processing unit (CPU), but may be another type of processor device such as a graphics processing unit (GPU). The at least one processor device may be a single-core or multi-core device. The at least one processor device may be a processor core device. The at least one processor device may be a processor device in a broad sense such as a circuit (for example, a field-programmable gate array (FPGA), a complex programmable logic device (CPLD), or an application specific integrated circuit (ASIC)) that is an aggregate of gate arrays in a hardware description language that performs a part or all of processing.

In addition, in the following description, a function may be described using an expression "yyy unit", but a function may be achieved by a processor executing one or more computer programs, may be achieved by one or more hardware circuits (for example, FPGA or ASIC), or may be achieved by a combination thereof. In a case where the function is achieved by the processor executing the programs, determined processing is appropriately performed by using the storage device and/or the interface device, and thus, the function may be at least a part of the processor. The processing described with the function being the subject may be processing performed by a processor or a device having the processor. The program may be installed from a program source. The program source may be, for example, a program distribution computer or a computer-readable recording medium (for example, a non-transitory recording medium). The description of each function is an example, and a plurality of functions may be integrated into one function or one function may be divided into a plurality of functions.

In addition, in the following description, in some cases, processing is described with a "program" being a subject, but the processing described with the program being a subject may be processing performed by a processor or a device including the processor. Further, two or more programs may be achieved as one program, or one program may be achieved as two or more programs.

In addition, in the following description, in a case where the same kind of elements are described without being distinguished, common reference symbols among reference numerals may be used, and in a case where the same kind of elements are distinguished, reference numerals may be used.

Further, in the following description, a "model operation support system" may be a system including one or more physical computers, or may be a system (for example, a cloud computing system) achieved on a physical computing resource group (for example, a cloud infrastructure). The model operation support system "displaying" information for display may mean that the information for display is displayed on a display device of a computer, or that the computer transmits the information for display to a computer for display (in the latter case, the information for display is displayed by the computer for display).

Further, in the following embodiment, the Sliced Wasserstein Distance based on a transport theory is used as an example of an "inter-distribution distance". Hereinafter, the "inter-distribution distance" is described as "SWD" that is the abbreviation of Sliced Wasserstein Distance.

Figure 1:
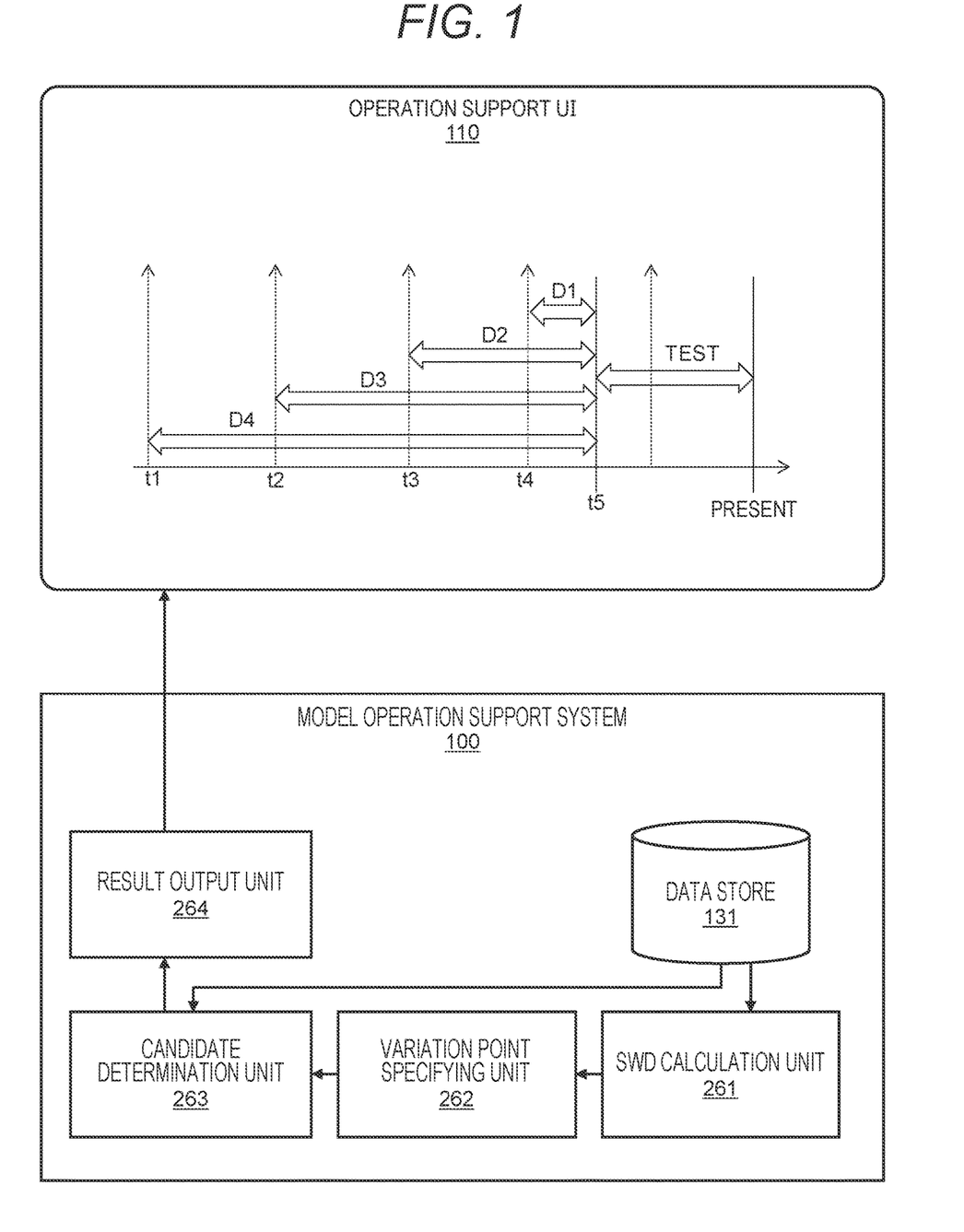
FIG. 1 illustrates an outline of an embodiment.

FIG. 1 illustrates an outline of an embodiment. Note that, in the following description, "UI" is the abbreviation of user interface, but is typically a graphical user interface (GUI).

A model operation support system 100 includes a data store 131, an SWD calculation unit 261, a variation point specifying unit 262, a candidate determination unit 263, and a result output unit 264.

Data is stored in the data store 131. The data may be structured data or unstructured data. Examples of the data stored in the data store 131 include data related to a learning model. As an example of the "data related to the learning model", any of an input variable (input data), a latent variable, an output variable (output data), and evaluation (for example, accuracy and a rate of correctness) of the learning model can be used. The learning model is, for example, a neural network.

An example of the data included in the data related to the learning model is collected data of an object of the learning model. The collected data includes information indicating a time and information as one or more input variables.

In addition, an example of the data included in the data related to the learning model is base data. The base data is data for a first period and is data (for example, data including at least one of an input variable input in creation of a learning model, an output variable that is output, and an obtained evaluation) related to the creation of the learning model. The first period may be any period such as one year, half a year, or one month.

Further, an example of the data included in the data related to the learning model is target data for one or more second periods. The one or more second periods are periods in the entire period between an end time of the first period and a relearning timing of the learning model of the machine learning. The target data is data for each of the second periods among the entire data (data for the entire period and data related to the learning model) in the data store 131. Since any of the second periods is a period of the future from the first period, the target data is data acquired after the base data related to the creation of the learning model. The one or more second periods may have identical length or different lengths. Further, the second period may have a length identical to or different from the length of the first period. Typically, the second period may be shorter than the first period. For example, the base data may be data for one year, and the target data may be data for one month.

Both the base data and the target data for each second period are respective sets of a plurality of data elements (typically, a large number of data elements) respectively corresponding to a plurality of times (typically, a large number of times). It is difficult to determine and output (for example, present) training data candidates in unit of data elements.

Further, as an example of the data included in the data related to the learning model is target data for one or Therefore, the SWD calculation unit 261 acquires the base data and the target data for each of the one or more second periods from the data store 131, and calculates SWD between the target data and the base data for each of the one or more second periods. The SWD calculation unit 261 may calculate the SWD between the target data and the base data regularly or irregularly (for example, when target data for a new second period is added to the data store 131).

For each of the one or more second periods, the variation point specifying unit 262 determines whether the calculated SWD is greater than or equal to a first threshold, and specifies a time according to the second period as a variation point when a result of the determination is true. The candidate determination unit 263 determines one or more training data candidates respectively corresponding to one or more periods in the entire period from a part or all of the entire data in the data store 131 based on one or more variation points. The result output unit 264 outputs the determined one or more training data candidates or meta-information about them for relearning of the learning model.

As described above, in the present embodiment, the partial data for each of the second periods is compared with the base data, and the SWD for each of the second periods is calculated. For example, the SWD does not necessarily increase linearly for a plurality of consecutive second periods. The tendency of the SWD depends on the object of the learning model. The time belonging to the second period in which the SWD is greater than or equal to the first threshold is specified as the variation point. One or more training data candidates are determined based on a plurality of (or one) specified variation points. For example, entire data for a continuous entire period may be discretized into one or a plurality of data sets with a plurality of (or one) variation points being boundaries, and each of the training data candidates may be a combination of two or more discretized data sets or any of a plurality of data sets divided from one data set. This makes it possible to determine one or more training data candidates appropriate for relearning of the learning model and output the one or more training data candidates or meta-information about them. One training data candidate may be one target data set or a plurality of target data sets. The SWD between the training data candidate and the base data may be based on the SWD calculated for one piece or each of a plurality of pieces of target data which is an element of the training data candidate.

As an example of an output for relearning of the learning model, as illustrated in FIG. 1, an operation support UI 110, which is a UI displaying one or more determined training data candidates or meta-information about them, is provided in some cases. The operation support UI 110 displays a chart that presents a period of each of one or more training data candidates. The chart has a time axis and represents a plurality of specified variation points (a plurality of broken line arrows) and one or more periods respectively corresponding to one or more training data candidates for a period between a current time (an example of a relearning timing) and the past. The period is expressed as [p, q] (p is a start time and q is an end time) as follows. That is, according to the example illustrated in FIG. 1, the training data candidates include D1 to D4, [t4, t5] corresponds to D1, [t3, t5] corresponds to D2, [t2, t5] corresponds to D3, and [t1, t5] corresponds to D4. In this manner, the base point for the period corresponding to the training data candidate is a time close to the current time (or the same time as the current time). This is because data closer to the current time is expected to indicate the latest tendency of the object of the learning model. The end time of the period corresponding to the training data candidate is not necessarily t5. For example, the period corresponding to D2 may be [t3, t4].

Note that "TEST" in the chart is test data related to a test (evaluation check) of the relearned learning model. The period corresponding to the test data is referred to as a "test period". According to the example illustrated in FIG. 1, time t5 is a time that precedes the current time by the test period. A technical significance in which the training data candidate is determined from the data for the period preceding the test period will be described later.

In addition, as described later, the result output unit 264 outputs one or more determined training data candidates for relearning of the learning model, and performs model deployment that is to change an inference model by replacing the learning model with the relearned learning model in response to a manual instruction or without a manual instruction. As described above, in the present embodiment, the model deployment of the relearned learning model is performed using one or more training data candidates instead of or in addition to one or more training data candidates or the meta-information about them. Therefore, convenience is high.

Hereinafter, the present embodiment will be described in detail.

Figure 2:
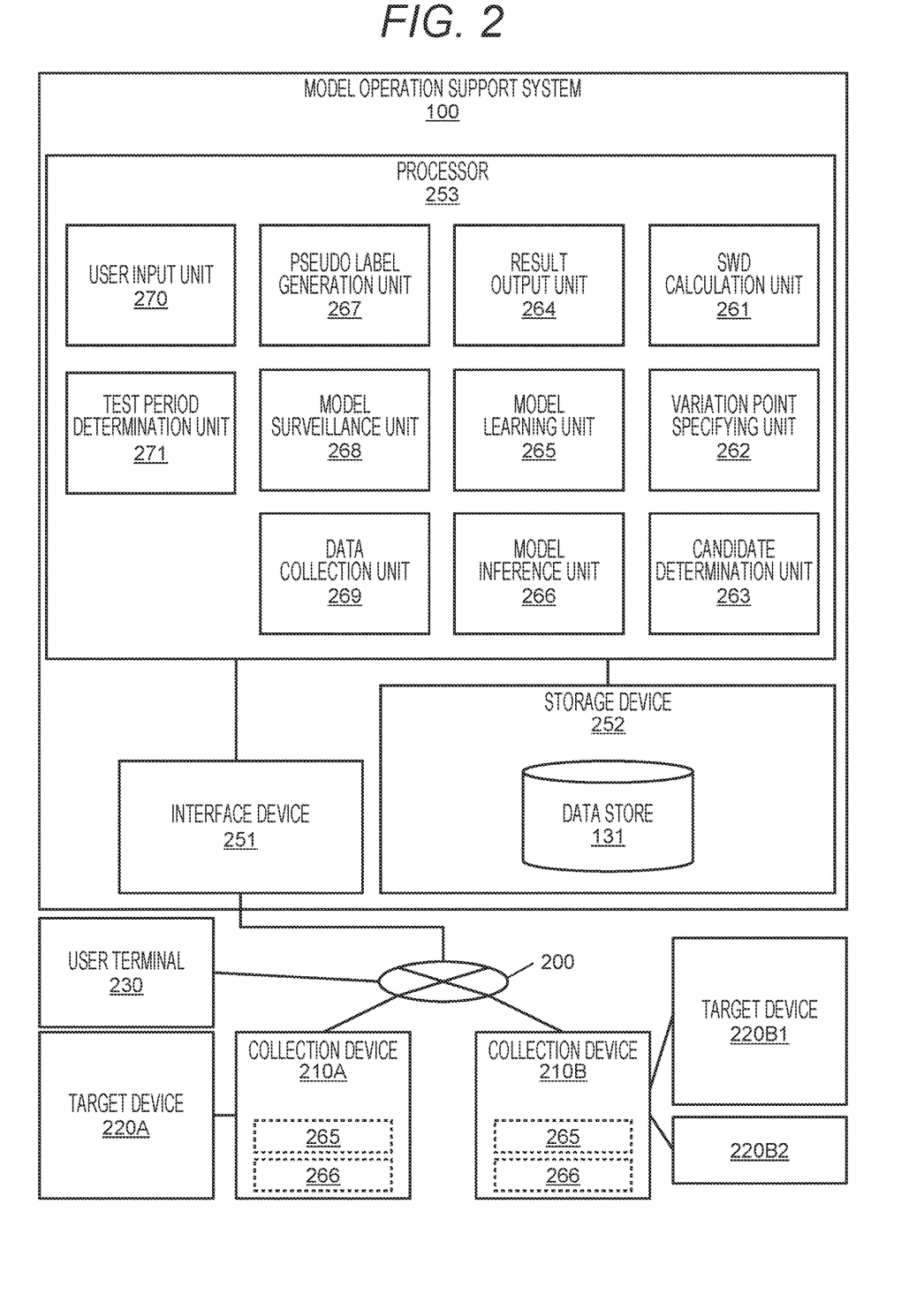
FIG. 2 illustrates a configuration example of an entire system including a model operation support system according to the embodiment.

FIG. 2 illustrates a configuration example of the entire system including the model operation support system 100.

The model operation support system 100 communicates with a user terminal 230 and one or a plurality of collection devices 210 (for example, two collection devices 210A and 210B) via a network 200 (for example, the Internet). The collection device 210 collects data from one or more target devices 220. For example, the collection device 210A collects data from one target device 220A, and the collection device 210B collects data from two target devices 220B1 and 220B2. For example, the model operation support system 100 may be an example of a core system, and the collection device 210 may be an example of an edge system.

The user terminal 230 is an information processing terminal (for example, a personal computer or a smartphone) of a user. The "user" may be a person who performs at least one of management and operation of the learning model, may be an administrator of the model operation support system 100, or may be a person who uses a model operation support service provided by the model operation support system 100. The above-described UI provided by the model operation support system 100 is displayed on the user terminal 230.

The target device 220 is a device as an object of the learning model. The collection device 210 collects data about the target device 220 and transmits the collected data to the model operation support system 100. For example, in a case where the learning model is a model for detecting a value indicated by an analog meter, the target device 220 may be an analog meter, the collection device 210 may be a camera that images the analog meter or a device that collects a captured image from the camera, and the collected data may be captured image data of the analog meter.

The model operation support system 100 includes an interface device 251, a storage device 252, and a processor 253 connected to them. Through the interface device 251, data is received from the collection device 210, and a UI is provided to the user terminal 230. The storage device 252 is a base of the data store 131. Data stored in the data store 131 is stored in the storage device 252. In addition, a computer program is stored in the storage device 252.

The computer program is executed by the processor 253 to implement the SWD calculation unit 261, the variation point specifying unit 262, the candidate determination unit 263, the result output unit 264, a model learning unit 265, a model inference unit 266, a pseudo label generation unit 267, a model surveillance unit 268, a data collection unit 269, a user input unit 270, and a test period determination unit 271. At least some of the functions 261 to 271, such as the model learning unit 265 and the model inference unit 266, may be provided in the collection device 210 that is an example of an edge system.

The functions 261 to 264 are as described above. The model learning unit 265 performs generation (learning) and relearning of the learning model. The model inference unit 266 performs inference using the learning model. The pseudo label generation unit 267 generates a pseudo label. The model surveillance unit 268 surveils inference using the inference model. The data collection unit 269 collects data from the collection device 210 and stores the collected data in the data store 131. The user input unit 270 provides the input UI to the user terminal 230 and receives an input via the input UI. The test period determination unit 271 determines a test period. Details of these functions 261 to 271 will be described later. Note that the "label" may be a label in a narrow sense as an output variable corresponding to an input variable in a data element, but in the present embodiment, the "label" is a label covering such a label in a narrow sense, that is, a label in a broad sense as a concept representing some classification. For example, in a case where two data elements include two narrow-sense labels different from each other and the label in the present embodiment covers the two narrow-sense labels (for example, in a case where the two narrow-sense labels are integers of "2" and "4", and the label in the present embodiment is "even number"), the two data elements may belong to one label. On the contrary, a data element to which the same narrow-sense label belongs may belong to a broad-sense label. Data elements may be associated with broad-sense labels instead of or in addition to the narrow-sense labels. The "pseudo label" is a pseudo label of a label in the present embodiment.

Figure 3:
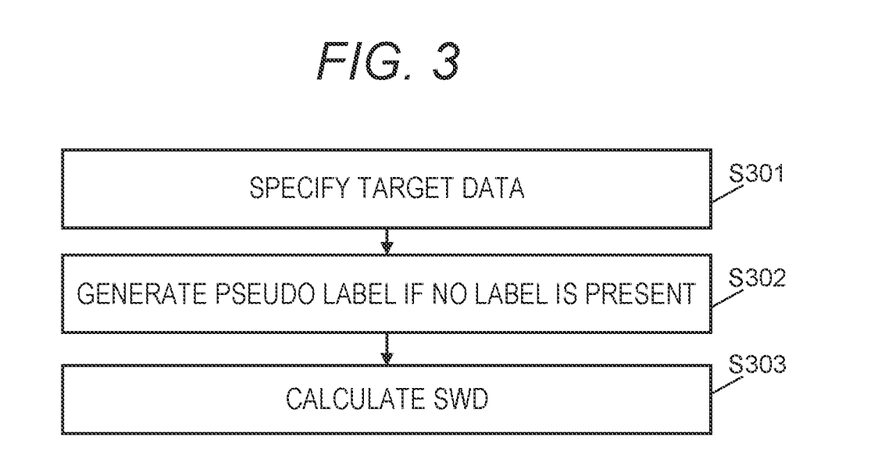
FIG. 3 illustrates an example of a flow of processing from specification of target data to calculation of an inter-distribution distance.

FIG. 3 illustrates an example of a flow of processing from specification of target data to calculation of SWD. Note that the base data and the target data in the following description are acquired from the data store 131. In addition, it is assumed that the model learning unit 265 creates a learning model and the model inference unit 266 uses the learning model as an inference model. For example, it is assumed that the data collection unit 269 receives data collected for the target device 220 from the collection device 210 and stores the data in the data store 131, and the model inference unit 266 inputs an input variable in the data to the inference model to obtain an output variable.

The processing illustrated in FIG. 3 is performed periodically (or irregularly). For example, this processing is performed in a case where the current timing is the calculation timing of the SWD. The "calculation timing" may be timing when a certain period elapses since the SWD has been previously calculated, or may be timing when the target data for which the SWD has not been calculated is detected from the data store 131.

The SWD calculation unit 261 specifies target data for which the SWD is not calculated (S301). In a case where a data element with which a label is not associated is present in the target data, the pseudo label generation unit 267 sets a result of clustering the base data as a pseudo label, generates a pseudo label to be given to the data element by causing an identification model such as a k-nearest neighbor algorithm to learn a relationship between the pseudo label and the base data (S302), and causes the generated label to be included in the data element in the data store 131. The SWD calculation unit 261 calculates the SWD between the base data and the target data selected in S302 (S303), and stores the calculated target data in the data store 131 as at least a part of the meta-information about the target data.

In this processing, the SWD between the target data and the base data is calculated for each of the second periods.

Note that in the present embodiment, the SWD between the target data and the base data may be the SWD between the input variables, but may be based on at least one of SWD between latent variables, SWD between output variables, and SWD between evaluations (for example, accuracy and a rate of correctness) instead of or in addition to the SWD between the input variables.

Figure 4:
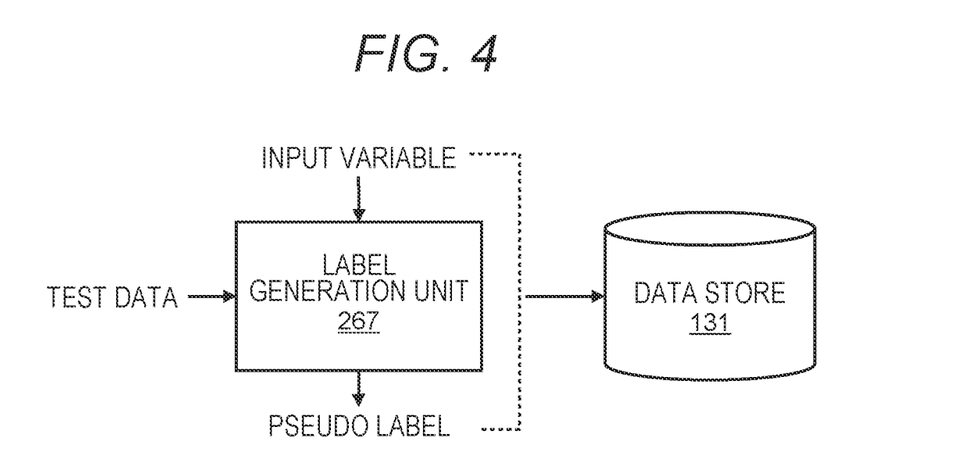
FIG. 4 schematically illustrates an example of generation of a pseudo label.

FIG. 4 schematically illustrates an example of generation of a pseudo label.

An example of a case where a data element including an input variable has no label is a case where the learning model is a learning model without teacher data. In such a case, generation and assignment of a pseudo label are effective. For each label, inference surveillance may be performed, or a determination may be made whether a set of data elements including labels is used as a training data candidate.

The generation of the pseudo label may be performed as follows, for example. That is, the pseudo label generation unit 267 clusters a plurality of data elements in the base data used to create the learning model into a plurality of data sets, and assigns a class to each of the data sets. The pseudo label generation unit 267 creates a model (for example, a neural network) in which a class assigned to each of the data sets is a pseudo label, and causes a pseudo label generation model as this model to learn through self-teaching. The pseudo label generation unit 267 inputs an input variable of a data element without a label to the learned pseudo label generation model, thereby obtaining an output variable corresponding to the input variable as a pseudo label. The pseudo label generation unit 267 associates the obtained pseudo label with the data element. For example, the pseudo label generation unit 267 causes the pseudo label to be included in the data element in the data store 131. As described above, the pseudo label generation model can be created when a learning model is created using the base data, and the pseudo label generation model can be used for relearning of the learning model.

The generation of the pseudo label enables utilization of partial data, such as calculation of an SWD for each label and a determination of a training data candidate for each label even if the label is not associated with the data element.

Figure 5:
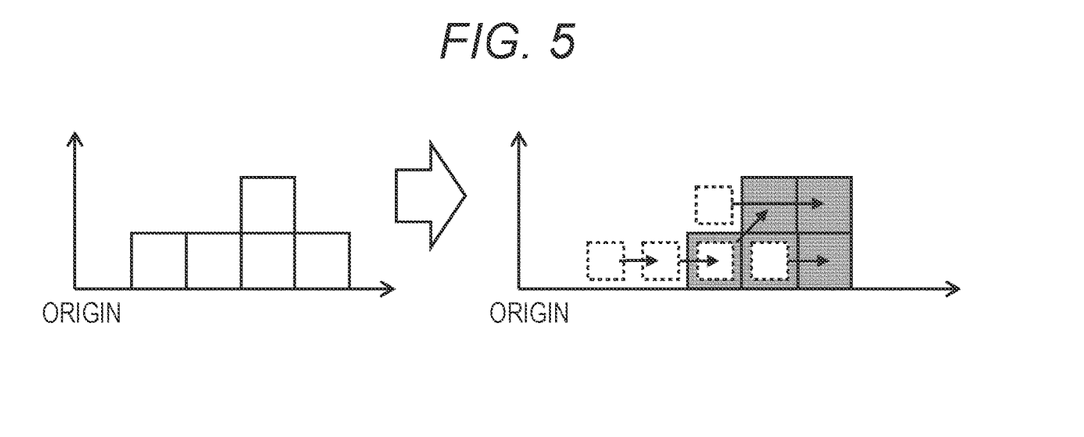
FIG. 5 schematically illustrates an example of calculation of the inter-distribution distance.

FIG. 5 schematically illustrates an example of calculation of the SWD.

In the present embodiment, a method using Sliced Wasserstein Distance (SWD) is used to calculate the SWD. The SWD is one of SWDs based on the concept of Wasserstein metric (transportation theory). It is known that SWD has a characteristic that one-dimensional Wasserstein Distance (WD) is a closed form, and that SWD can be calculated in combination with Radon transform without learning. Further, it is known that, as compared with Kullback-Leibler divergence, SWD gradually changes with respect to a change in distribution (for example, when SWD is used for learning of a neural network, it becomes a countermeasure against gradient disappearance).

SWD has, for example, the following characteristics.
  In a case of one-dimensional discrete distribution, two samples A and B are sorted, and the sum of absolute values of element-wise differences is SWD.
  The size of the SWD of samples sampled from one distribution depends on the sample size (the number of elements in the set). For example, when many elements that need to be transported are present, the SWD is great.
  The size of the SWD depends on the degree of variation in the distribution. For example, when the transport distance is long, the SWD is great.

The example illustrated in FIG. 5 describes the SWD between the base data and certain target data. The base data is five white blocks, and the target data is five gray blocks. Each block is a sample (a set of data elements). A value "6" that is the minimum value of the total travel distance required to move the five white blocks to the positions of the five gray blocks is the transport distance (SWD).

Figure 6:
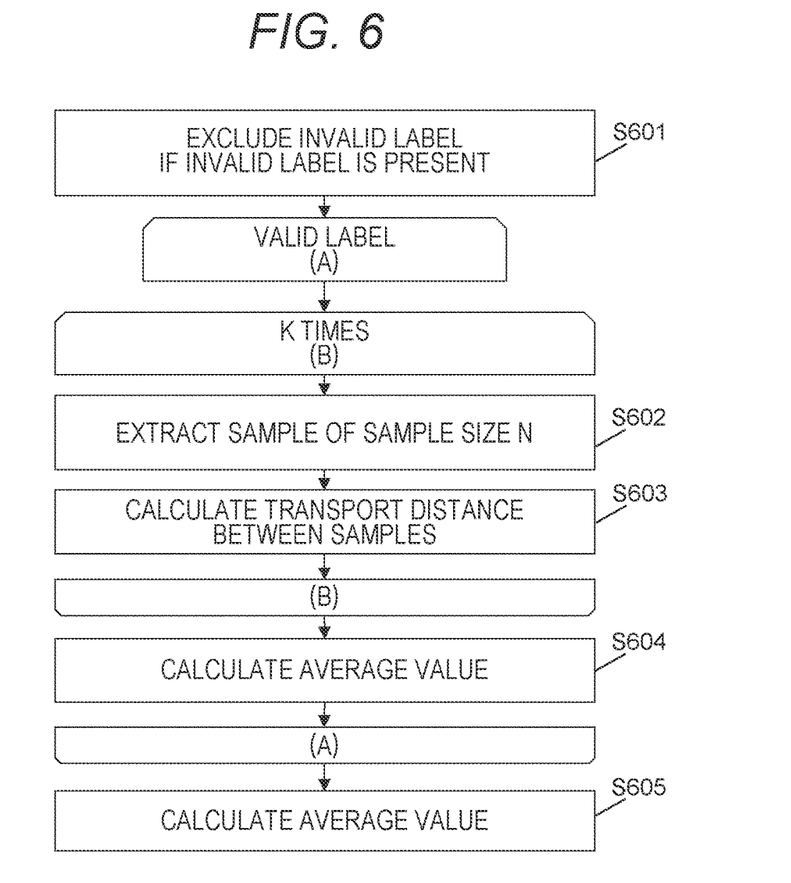
FIG. 6 illustrates an example of a detailed flow of processing for calculating the inter-distribution distance.

FIG. 6 illustrates an example of a detailed flow of processing for calculating the SWD.

According to FIG. 6 (and FIG. 5), in the present embodiment, the target data elements are classified according to labels for each target data, the sampling size is fixed, and the sampling size is identical between the target data and the base data. Further, the sampling size is identical between the labels. This is to prevent the scale of the transport distance from varying between labels. On the other hand, the calculation accuracy of the SWD is improved as the number of samples is larger, but the identical value is used in the present embodiment. FIG. 6 will be described in detail by taking certain target data (a certain second period) as an example.

The SWD calculation unit 261 determines presence or absence of an invalid label. If an invalid label is present, the SWD calculation unit 261 excludes the invalid label from the plurality of labels (S601). The remaining labels are valid labels. For example, at least one valid label (or invalid label) may be manually selected via the input UI provided by the user input unit 270. Here, the "invalid label" is a label for which the number of target data elements (data elements in the target data) is less than a predetermined value L (L is a natural number). If the number of data elements is too small, the SWD itself is unreliable because it is greatly affected by noise, and thus an invalid label is excluded.

The SWD calculation unit 261 performs steps S602 to S604 for each valid label. One valid label is taken as an example. If the plurality of valid labels does not match between the target data and the base data, steps S602 to S604 are performed for each of one or more common valid labels. Specifically, for example, if a certain label is a valid label in both the target data and the base data, the processing after S602 is performed. In other words, if the certain label is invalid in one or both of the target data and the base data, the processing after S602 is not performed for the certain label.

The SWD calculation unit 261 performs a set of S602 and S603 K times (K is a natural number). In S602, the SWD calculation unit 261 extracts a sample (a set of data elements) having sample size N from a plurality of data elements associated with a valid label for each of the base data and the target data. In S603, the SWD calculation unit 261 calculates the transport distance between the samples extracted in S602, and stores information indicating the calculated transport distance in the data store 131. Since such S602 and S603 are performed K times, K samples are extracted from each of the base data and the target data, and K transport distances for the valid label are obtained.

Thereafter, the SWD calculation unit 261 calculates an average value of the K transport distances (S604). The average value calculated in S604 is the transport distance calculated for the valid label. Instead of the average value of the K transport distances, another type of value based on the K transport distances, such as a weighted average, a maximum value, or a minimum value, may be obtained.

Since the above S602 to S604 are performed for each valid label, the transport distance can be obtained for each valid label. The SWD calculation unit 261 calculates an average value of two or more transport distances respectively corresponding to two or more valid labels (S605). The average value calculated in S605 is the transport distance calculated for the target data. Instead of the average value of the two or more transport distances, another type of value based on the two or more transport distances, such as a weighted average, a maximum value, or a minimum value, may be obtained. The SWD calculation unit 261 associates the transport distance (SWD) calculated in S605 with the target data in the data store 131. Therefore, the transport distance calculated for the target data can be specified from the data store 131.

The description with reference to FIGS. 5 and 6 is as follows, for example. That is, for each of the one or more second periods, the SWD calculation unit 261 calculates K transport distances (an example of K sub-SWDs) which is transport distances between K sub-target sets (K is a natural number) and K sub-base sets for each of two or more valid labels among the plurality of labels of the plurality of target data elements, and calculates the transport distances for the labels based on the K transport distances. The SWD calculation unit 261 calculates the SWD between the target data and the base data based on two or more transport distances respectively corresponding to two or more labels. For each of the valid labels, K sub-target sets are K samples extracted from a set of target data elements respectively associated with the valid labels, and K sub-base sets are K samples extracted from a set of base data elements respectively associated with the valid labels. In addition, for each valid label, the number of the target data elements for each sub-target set is identical to the number of base data elements for each sub-base set (identical sample size). In this manner, the SWD between the target data that is the set of the plurality of the target data elements and the base data that is the set of the plurality of the base data elements can be appropriately calculated.

Figure 7:
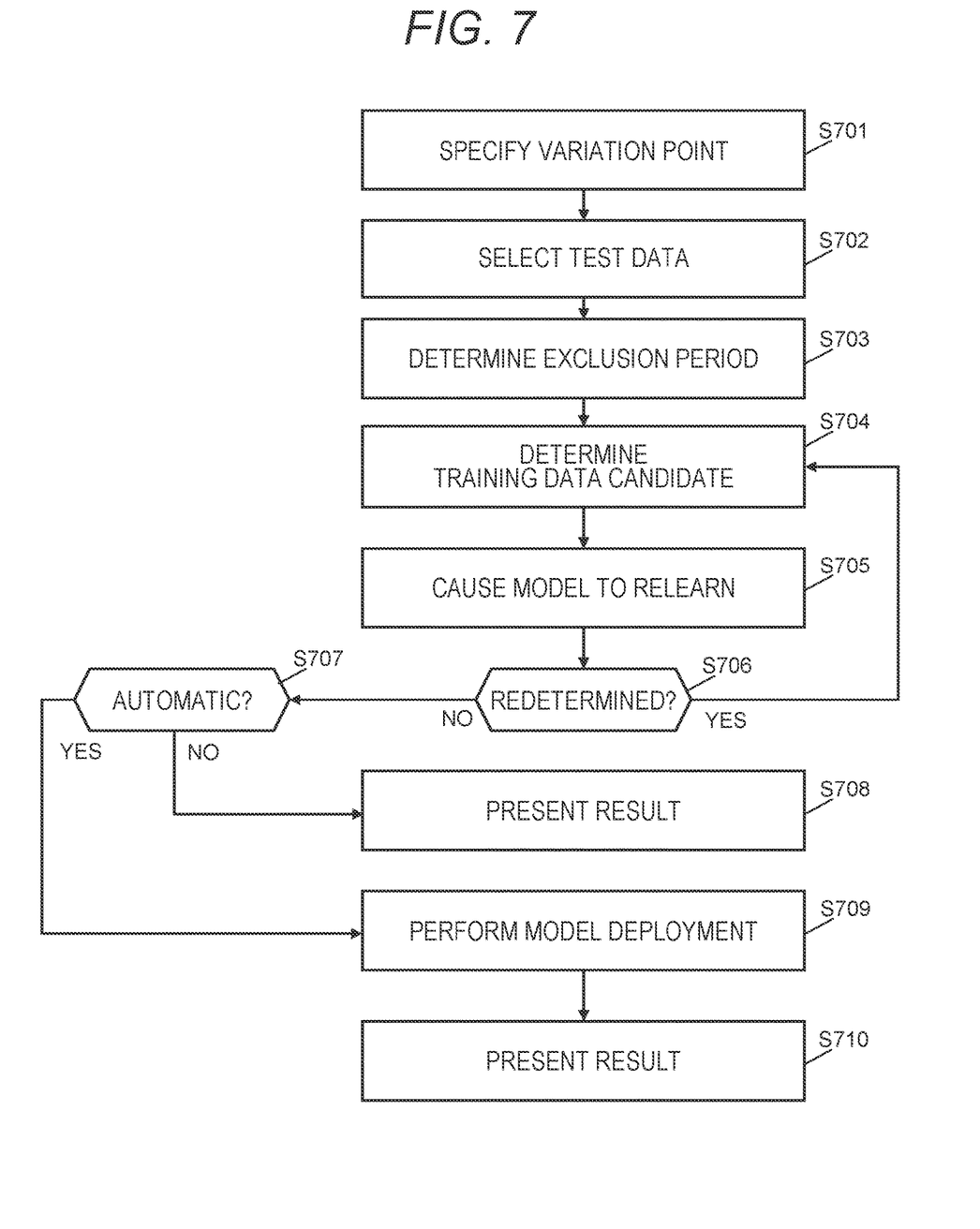
FIG. 7 illustrates an example of a flow of processing to be performed when a relearning timing is detected.

FIG. 7 illustrates an example of a flow of processing to be performed when a relearning timing is detected.

In a case where the detection is made that the current time is the relearning timing of the learning model, this processing is performed. For example, the model surveillance unit 268 may surveil whether the degree of change in the tendency of inference including the input to the inference model and the output from the inference model has reached a certain degree or more. The relearning timing may be timing at which it is detected that the degree of change is greater than or equal to the certain degree. This makes it possible to automatically determine an appropriate training data candidate and cause the learning model to relearn when the degree of change in the tendency of inference reaches the certain degree or more. Note that the "degree of change in the tendency of inference" may be at least one of the degree of change in the input variable input in the inference, the degree of change in the output variable output in the inference, and the evaluation of the inference model. Further, the "certain degree" may be a value for detecting concept drift, and this value may be identical to the above-described first threshold that is compared with the SWD for specifying a variation point, but may typically be a value higher than the first value. In the present embodiment, in a case where the SWD calculated for the target data is greater than or equal to the first threshold lower than such a certain degree, the time belonging to the second period corresponding to the target data may be specified as the variation point. That is, the variation point can be said to be a time at which the variation point is estimated to be not enough high for concept drift but be a sign of concept drift.

In a case where a detection is made that the current time is the relearning timing of the learning model, the variation point specifying unit 262 specifies the variation point (S701). Specifically, for example, the variation point specifying unit 262 specifies the calculated SWD for each second period in the entire period (for each piece of target data in the data store 131), and determines whether the SWD is greater than or equal to the first threshold. The time belonging to the second period during which the SWD greater than or equal to the first threshold is calculated is specified as the variation point.

The test period determination unit 271 determines a test period to select test data from the data store 131 (S702). The test data is data for the test period among the data related to the learning model.

The test period may be a past period having an end time at the relearning timing. The length of the test period may be determined based on an entire period that is a period between the end time (for example, the end time of generation of the learning model or immediately previous relearning) of the first period and the relearning timing (for example, the length may be a length corresponding to a predetermined ratio of the entire period).

Instead of or in addition to the determination of the test period, data included in the test data may be specified via the input UI provided by the user input unit 270. For example, data including the input variable identical to an input variable that is necessarily input in inference may be specified via the input UI.

The candidate determination unit 263 determines an exclusion period (S703). Specifically, for example, if each of two or more SWDs respectively corresponding to two or more consecutive second periods is less than the first threshold but is greater than or equal to the second threshold, the candidate determination unit 263 determines the period between the start time and the end time of the two or more consecutive second periods as the exclusion period. Such a period is likely to be a period during maintenance or calibration of the target device 220, and data collected during such a period is not data indicating a tendency of the target device 220. The training data candidate is determined from the data for the period other than the exclusion period, thereby making it possible to avoid a situation that data inappropriate as the training data is determined as the training data candidate.

The candidate determination unit 263 determines one or more training data candidates based on one or more variation points (the variation points specified in S701) belonging to a period other than the test period in the entire period (S704).

At least one of the start time and the end time of the period corresponding to each training data candidate is any variation point. However, if some variation points are included in the exclusion period, one of the start time and the end time of the period corresponding to a certain training data candidate may be the start time or the end time of the exclusion period.

In addition, the one or more determined training data candidates may be training data candidates in different periods for each label. That is, a determination may be made whether to set the data in the same period as the training data candidate for each label. As a result, data for one month may be set as a training data candidate for a certain label, and data for two months may be set as a training data candidate for another label. Since the label is an output variable itself with respect to an input variable or corresponds to the output variable, the determination of the label-specific training data candidate may contribute to improving the appropriateness of the training data candidate.

The result output unit 264 outputs one or more training data candidates determined in S704 for relearning. Specifically, the result output unit 264 outputs the one or more training data candidates determined in S704 to the model learning unit 265, and the model learning unit 265 causes the learning model to relearn using the one or more training data candidates (S705).

The candidate determination unit 263 determines whether to re-determine a training data candidate (S706).

The case where the result of the determination in S706 is false is, for example, the following case, that is, a case where a period (excluding an exclusion period) is added from a base point such as an end time of a test period to the past in units of a period between the base point (or the variation point) and the next variation point, and data for a period after the period addition is one of training data candidates. In this case, the result is NO in S706, and the processing proceeds to S707.

The case where the result of the determination in S706 is true is, for example, the following case, that is, a case where the evaluation of the relearned learning model is less than a predetermined evaluation (for example, a first evaluation, described later). Specifically, for example, the result output unit 264 evaluates the relearned learning model using the output one or more training data candidates. If the evaluation is less than the predetermined evaluation, the result is YES in S706, and the processing returns to S704. The candidate determination unit 263 extends a period corresponding to at least one training data candidate among the one or more training data candidates determined previously in S704 to a next variation point of the period or shortens the period to determines one or more new training data candidates. According to an example of extending the period, the period is changed from [t3, t4] to [t3, t5]. According to an example of shortening the period, the period is changed from [t3, t5] to [t3, t4]. In this case, the training data candidate may be determined randomly first. In this way, when the determination, relearning, and evaluation of the training data candidate is repeated, it is possible to expect the determination of the training data candidate with which the optimal learning model is obtained as the relearned learning model.

The result output unit 264 determines whether to automatically deploy the relearned learning model (S707). Specific examples thereof are as follows.

Whether the determination result in S707 is true or false may be whether automatic deployment is preset.

Whether the determination result in S707 is true or false may be whether the evaluation of the relearned learning model is higher than or equal to the second evaluation, or higher than or equal to the first evaluation but less than the second evaluation.

If the result of the determination in S707 is false (NO in S707), for example, in a case where the evaluation of the relearned learning model is higher than or equal to the first evaluation but less than the second evaluation, the result output unit 264 provides the operation support UI 110 indicating one or more training data candidates determined in S704 or meta-information about them (S708).

On the other hand, if the result of the determination in S707 is true (YES in S707), for example, in a case where the evaluation of the relearned learning model is higher than or equal to the second evaluation, the result output unit 264 performs model deployment that is to change the inference model by replacing the learning model with the relearned learning model without presenting the operation support UI 110 (S709). For example, in a case of high evaluation that the evaluation of the relearned learning model is higher than or equal to the second evaluation, the model deployment is automatically performed (in the background), which is highly convenient. In a case where S709 is performed, the result output unit 264 provides a UI displaying reference information (for example, information indicating a result of inference after the automatic deployment) about the result of the automatic deployment (S710). Note that S709 may be performed when the user inputs a deployment instruction to the operation support UI 110 presented in S708.

Figure 8:
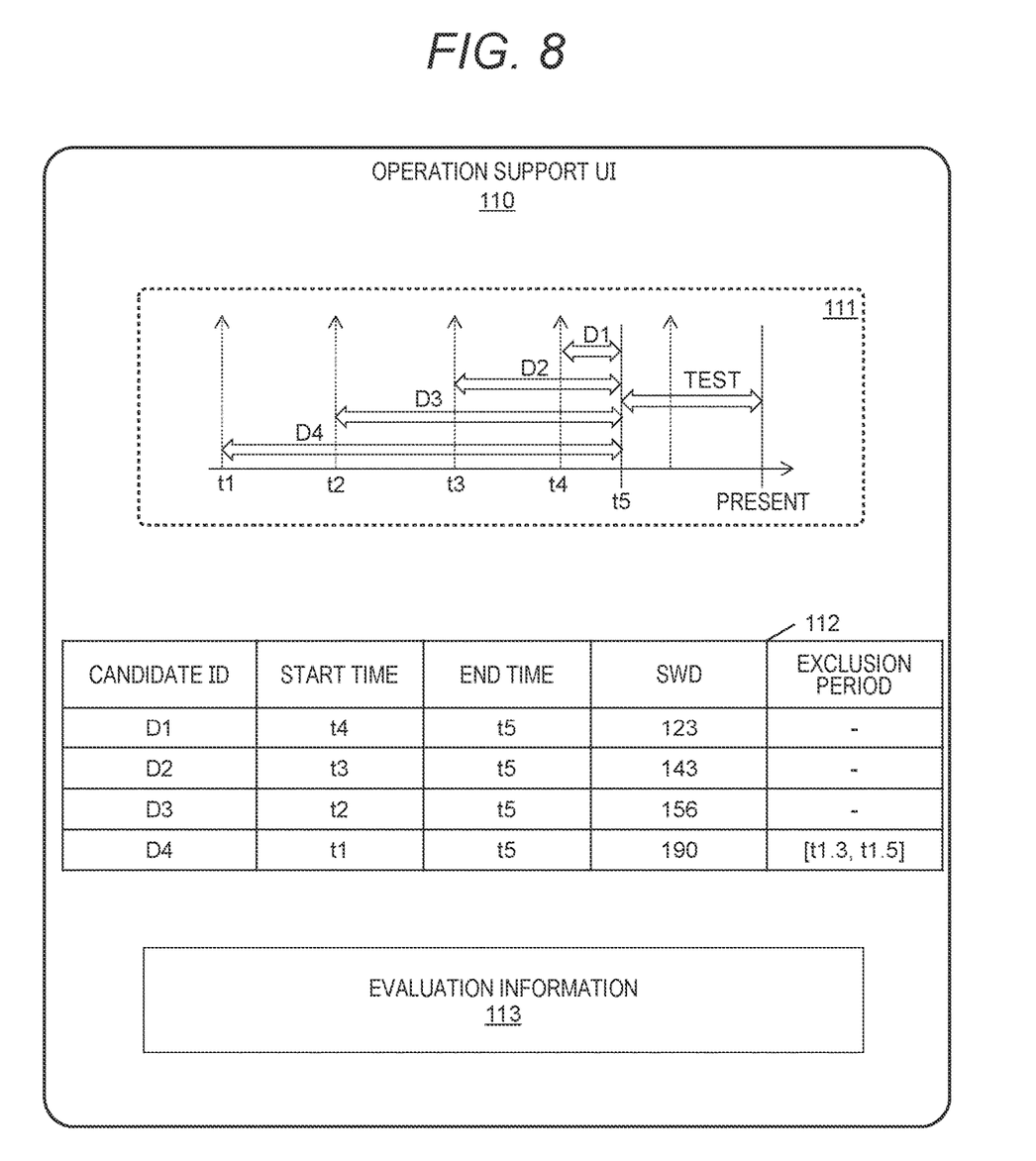
FIG. 8 illustrates an example of an operation support user interface (UI).

FIG. 8 illustrates an example of the operation support UI 110.

The operation support UI 110 displays at least one of a candidate presentation chart 111 and a meta-information list 112. The operation support UI 111 may display evaluation information 113.

The candidate presentation chart 111 is a chart that presents a period of each of the one or more training data candidates. The candidate presentation chart 111 has a time axis and represents a plurality of specified variation points (a plurality of broken line arrows) and one or more periods respectively corresponding to one or more training data candidates for a period between a current time (an example of relearning timing) and the past.

"TEST" in the candidate presentation chart 111 is test data related to the test of the relearned learning model. According to the example illustrated in FIG. 8, time t5 is a time that precedes the current time by the test period. According to the example illustrated in FIG. 8, the training data candidate is determined from data corresponding to a period that precedes the test period. When a training data candidate later than the test data is present, the training data candidate is likely to include an input variable in the test data and an output variable as a correct answer for the input variable. In a case where the entire data corresponding to the entire period is time-series data, the likelihood is high. When the relearning of the learning model is performed using such a training data candidate, the relearned learning model becomes a learning model in which a correct output variable is output with respect to the input variable in the test data, and this may result in reduction of the significance of the test using the test data. According to the present embodiment, the test period is a past period starting from the current time, and the period corresponding to the training data candidate is a period preceding the start time of the past period (test period). Therefore, future data after the test data is not determined as a training data candidate.

The meta-information list 112 is a list of meta-information about training data candidates. For example, the meta-information list 112 represents, for each training data candidate, an ID of a candidate, a start time of a period corresponding to the candidate, an end time of the period, an SWD of the candidate, and an exclusion period during the period.

An example of the SWD for each training data candidate may be as follows. That is, in a case where the period corresponding to the training data candidate corresponds to any second period, the SWD for the training data candidate may be the SWD corresponding to the second period. In a case where the period corresponding to the training data candidate corresponds to consecutive two or more second periods, the SWD for the training data candidate may be based on two or more SWDs corresponding to the two or more second periods.

In addition, the exclusion period "[t1.3, t1.5] corresponding to the candidate ID "D4" is a period between the variation point t1 and the variation point t2. According to the candidate presentation chart 111, D4 is the data for the period [t1, t5], but according to meta-information list 112, D4 is the data obtained by excluding the data for the exclusion period "[t1.3, t1.5] from the data for the period [t1, t5].

The evaluation information 113 may be information indicating the evaluation (for example, accuracy and a rate of correctness) of the relearned learning model using the candidate for each training data candidate.

Using the operation support UI 110 as described above, the user can check the meta-information about each training data candidate while overlooking the relationship between the current time (an example of the relearning timing, the period for each training data candidate, and the test period.

Although one embodiment has been described above, this is an example for describing the present invention, and it is not intended to limit the scope of the present invention only to this embodiment. The present invention can be carried out in various other forms.

For example, at least one of the test period and the exclusion period may be omitted.

Figure 9:
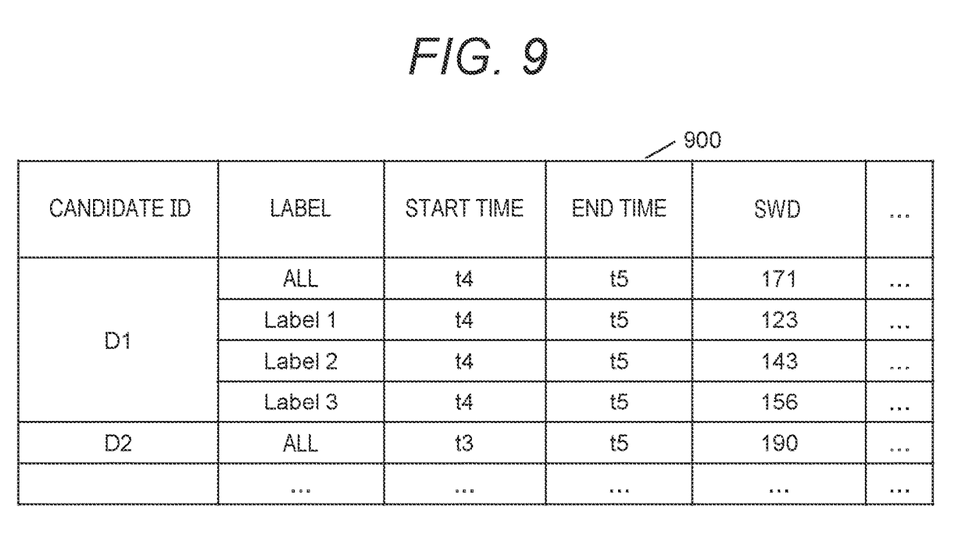
FIG. 9 illustrates a modification of a meta information list in the operation support UI.

Further, in the operation support UI 110, a meta-information list 900 illustrated in FIG. 9 may be used instead of the meta-information list 112 illustrated in FIG. 8. According to the example illustrated in FIG. 9, the meta-information including the start time, the end time, and the SWD is displayed for each label for each training data candidate.

REFERENCE SIGNS LIST 100 model operation support system

The invention claimed is:
1. A model operation support system comprising:
an interface device;
a storage device in which target data and base data are stored; and
a processor connected to the interface device and the storage device, wherein the processor is configured to:
calculate an inter-distribution distance between the target data and the base data for each of one or more second periods of an entire period that is a period between an end time of a first period and a relearning timing of a learning model of machine learning,
the target data being data for each of the one or more second periods of the entire data,
the entire data being data for the entire period and being data related to the learning model,
the base data being data for the first period and being data related to creation of the learning model,
determine whether the calculated inter-distribution distance is greater than or equal to a first threshold for each of the one or more second periods,
specify a time in accordance with each of the one or more second periods as a variation point when a result of the determination is true,
determine one or more training data candidates respectively corresponding to one or more periods in the entire period from a part or all of the entire data, based on one or more variation points,
output the determined one or more training data candidates or meta-information about the one or more training data candidates via the interface device for relearning of the learning model,
perform relearning of the learning model to generate a relearned learning model using the determined one or more training data candidates,
perform an evaluation of the relearned learning model, present the determined one or more training data candidates or the meta-information about the one or more training data candidates upon determining the evaluation is more than or equal to a first predetermined evaluation and less than a second predetermined evaluation, and automatically perform model deployment in which an inference model is changed by replacing the learning model with the relearned learning model without presenting the determined one or more training data candidates or the meta-information about the one or more training data candidates upon determining the evaluation is greater than or equal to the predetermined second evaluation.

2. The model operation support system according to claim 1, wherein the processor is configured to provide, via the interface device, a user interface displaying the determined one or more training data candidates or the meta-information about the one or more training data candidates, wherein the meta-information includes information indicating a start time and an end time of a period corresponding to each of the determined one or more training data candidates, and wherein at least one of the start time and the end time of the period corresponding to each of the determined one or more training data candidates is any variation point.

3. The model operation support system according to claim 1, wherein the processor is configured to calculate the inter-distribution distance between the target data and the base data for each of the one or more second periods, based on an inter-distribution distance between a plurality of sub-target data sets in the target data and a plurality of sub-base data sets in the base data, and upon determining there is a period during which the inter-distribution distance is continuously less than the first threshold and greater than or equal to a second threshold, determine a training data candidate from data for a period obtained by excluding the period from the entire period.

4. The model operation support system according to claim 1, wherein the target data is a set of a plurality of target data elements belonging to each of the one or more second periods, wherein the base data is a set of a plurality of base data elements, wherein the processor, for each of the one or more second time periods, is configured to:

calculate, for each of two or more labels among a plurality of labels of the plurality of target data elements, K sub inter-distribution distances that are inter-distribution distances between K sub-target sets and K sub-base sets, K being a natural number, to calculate an inter-distribution distance between the two or more labels based on the K sub-inter-distribution distances, and calculate the inter-distribution distance between the target data and the base data based on the two or more inter-distribution distances respectively corresponding to the two or more labels, wherein for each of the plurality of labels, the K sub-target sets are K sets in the set of the plurality of target data elements associated with each of the plurality of labels, the K sub-base sets are K sets in the set of the plurality of base data elements associated with each of the plurality of labels, and a number of the target data elements of each of the sub-target sets is identical to a number of the base data elements of each of the sub-base sets.

5. The model operation support system according to claim 4, wherein, when one or more invalid labels are present, the two or more labels are two or more valid labels that are labels other than the one or more invalid labels among the plurality of labels, and wherein each of the invalid labels is a label in which the number of the target data elements is less than a predetermined number.

6. The model operation support system according to claim 4, wherein the processor is configured to further generate a pseudo label for a target data element when the target data element has no label.

7. The model operation support system according to claim 1, wherein the processor is configured to surveil whether a degree of change in a tendency of inference including input to an inference model and output from the inference model has reached a certain degree or more, wherein the relearning timing is timing at which it is detected that the degree of change is greater than or equal to the certain degree, and wherein the processor is configured to, upon detecting that the degree of change has reached the certain degree or more, the one or more variation points are specified and the one or more training data candidates are determined.

8. The model operation support system according to claim 1, wherein the one or more training data candidates are training data candidates for different periods in accordance with labels.

9. The model operation support system according to claim 1, wherein, when the one or more training data candidates are determined, the processor is configured to:

output the one or more training data candidates for relearning of the learning model and evaluates the relearned learning model, and when the evaluation is less than a predetermined evaluation, extend a period corresponding to at least one of the one or more training data candidates to a next variation point of the period or shortens the period to determine one or more new training data candidates.

10. The model operation support system according to claim 1, wherein the processor is configured to:

perform model deployment that is to change an inference model by replacing the learning model with the relearned learning model in response to a manual instruction or without a manual instruction.

11. The model operation support system according to claim 1, wherein the processor is configured to:

set, as a test period, a past period having an end time at the relearning timing, and determine one or more training data candidates from data for a period other than the test period in the entire period based on one or a plurality of variation points between a start time of the test period and a past time before the start time, and wherein at least one of a start time and an end time of a period corresponding to each of the one or more training data candidates is any variation point.

12. A model operation support method, executed by a computer, comprising:
    calculating an inter-distribution distance between target data and base data for each of one or more second periods of an entire period that is a period between an end time of a first period and a relearning timing of a learning model of machine learning,
    the target data being data for each of the one or more second periods of entire data,
    the entire data being data for the entire period and being data related to the learning model,
    the base data being data for the first period and being data related to creation of the learning model;
    determining whether the calculated inter-distribution distance is greater than or equal to a threshold for each of the one or more second periods and specifying a time in accordance with each of the one or more second periods as a variation point when a result of the determination is true;
    determining one or more training data candidates respectively corresponding to one or more periods in the entire period from a part or all of the entire data, based on one or more variation points;
    outputting the determined one or more training data candidates or meta-information about the one or more training data candidates for relearning of the learning model;
    performing relearning of the learning model to generate a relearned learning model using the determined one or more training data candidates;
    perform an evaluation of the relearned learning model;
    present the determined one or more training data candidates or the meta-information about the one or more training data candidates upon determining the evaluation is more than or equal to a first predetermined evaluation and less than a second predetermined evaluation; and
    automatically perform model deployment in which an inference model is changed by replacing the learning model with the relearned learning model without presenting the determined one or more training data candidates or the meta-information about the one or more training data candidates upon determining the evaluation is greater than or equal to the predetermined second evaluation.

* * * * *